(12) United States Patent  (10) Patent No.: US 9,139,245 B2
Liao et al.  (45) Date of Patent: Sep. 22, 2015

(54) BICYCLE LIGHT ASSEMBLY

(71) Applicant: S-SUN ENTERPRISE CO., LTD., Taichung (TW)

(72) Inventors: Su-Chang Liao, Taichung (TW); Di-Shun Liao, Taichung (TW)

(73) Assignee: S-SUN ENTERPRISE CO., LTD., Taichung ( * ) Notice: Subject to any disclaimer, the term of this patent is extended or adjusted under 35 U.S.C. 154(b) by 46 days.

(21) Appl. No.: 14/258,005

(22) Filed: Apr. 21, 2014

(65) Prior Publication Data

US 2015/0158538 A1 Jun. 11, 2015

(30) Foreign Application Priority Data

Dec. 11, 2013 (TW) .............................. 102223379 U

(51) Int. Cl.
 B62J 6/00 (2006.01)
 B62L 1/00 (2006.01)
 B62M 3/12 (2006.01)

(52) U.S. Cl.
 CPC .. B62J 6/003 (2013.01); B62J 6/00 (2013.01); B62L 1/00 (2013.01); B62M 3/12 (2013.01)

(58) Field of Classification Search
 CPC ............... B62J 6/00; B62J 6/001; B62J 6/003
 See application file for complete search history.

(56) References Cited

U.S. PATENT DOCUMENTS

| 3,031,544 | A | * | 4/1962 | Gagnon | 200/61.12 |
|---|---|---|---|---|---|
| 3,906,443 | A | * | 9/1975 | Musselman | 340/432 |
| 4,031,343 | A | * | 6/1977 | Sopko | 200/61.12 |
| 4,792,882 | A | * | 12/1988 | Guevremont | 362/473 |
| 4,896,138 | A | * | 1/1990 | Nickols | 340/479 |
| 4,899,023 | A | * | 2/1990 | Shu-Hwa | 200/61.12 |
| 4,920,464 | A | * | 4/1990 | Balentine, III | 362/473 |
| 5,504,662 | A | * | 4/1996 | Huang | 362/473 |
| 5,526,240 | A | * | 6/1996 | Kuo | 362/473 |
| 5,739,750 | A | * | 4/1998 | Drake | 340/432 |
| 6,688,436 | B1 | * | 2/2004 | Wang | 188/1.11 L |
| 2012/0249316 | A1 | * | 10/2012 | Morrow et al. | 340/432 |

FOREIGN PATENT DOCUMENTS

| DE | 3129198 | A | * | 8/1983 |
|---|---|---|---|---|
| GB | 860766 | A | * | 2/1961 |

* cited by examiner

*Primary Examiner* — Charlie Y Peng

(57) ABSTRACT

A bicycle light assembly includes a body having a light end and a clamp end. A resilient member is pivotably connected to the body and has a clamp portion which is cooperated with the clamp end of the body to be connected with the brake cable. When braking, the resilient member is pivoted relative to the body and activates the light unit in the light end of the body. An isolation ring is located between the light member of the light unit and the battery to increase the sensibility of the light unit.

7 Claims, 8 Drawing Sheets

BICYCLE LIGHT ASSEMBLY

BACKGROUND OF THE INVENTION

1. Fields of the Invention

The present invention relates to a bicycle light assembly, and more particularly, to a bicycle light assembly connected with the brake cable which moves to activate the light assembly when braking.

2. Descriptions of Related Art

The conventional bicycle light assembly is used to provide illumination or to provide a visible light source for the drivers so as to protect the cyclist. However, when the bicycle brakes, there is no proper light assembly available so as to provide a brake light to the following drivers. For most of the vehicles and motorcycles, there is a brake light which is activated when the vehicle and motorcycle is braked by the driver and rider.

One of the conventional bicycle brake light assemblies comprises a back board to which the brake light and the turn lights are installed. The back board is connected to the bicycle frame. A control member is electrically connected to the brake light and the turn lights. An audio member is also connected with the control member. A sensor is electrically connected to the brake light assembly and comprises a plate which is connected with the brake cable so as to detect the movement of the brake cable.

However, the wires connected between the light assembly and the sensor are exposed and easily damaged to cause malfunction of the light assembly. Furthermore, the sensor has to bear the force from the brake cable when the brake cable is pulled. The sensor cannot bear a sudden and significant force when braking the bicycle urgently, so that the sensor may be broken. Besides, the sensor and the light assembly are two individual parts which occupy a significant space so that they may not suitable for some types of bicycles. The brake light assembly has to be cooperated with the back board to be installed to the bicycle frame, the assembling processes are not convenient for some users.

The present invention intends to provide a brake light assembly for a bicycle and the brake light assembly is sensitively activated when braking so as to eliminate the shortcomings mentioned above.

SUMMARY OF THE INVENTION

The present invention relates to a bicycle light assembly and comprises a body having a light end and a clamp end. A light unit is located in the light end and has a battery which has a first pole and a second pole. A light member has a light bulb, a first leg and a second leg. The first leg has a first end connected to the light bulb and a second end of the first leg is located corresponding to the first pole of the battery. The second leg has a first end connected to the light bulb and a second end of the second leg is connected to the second pole of the battery. A button unit has a button and a touch end. The button protrudes from the light end of the body. The touch end is located in the light end and corresponding to the first leg. An isolation ring is a tapered ring and has a central hole. The isolation ring is tapered toward the button unit. The first leg is in contact with the surface of the isolation ring. The second end of the first leg is located corresponding to the central hole and the first pole. The first leg is located between the button unit and the isolation ring. A resilient member is pivotably connected to the body and has a clamp portion which is connected with a brake cable. A press portion extends from the clamp portion and located corresponding to the button unit.

When the brake system of the bicycle is not yet operated, the isolation ring isolates the first leg from the battery. When braking, the brake cable moves and the press portion of the resilient member to press the button unit so that the first leg extends through the central hole of the isolation ring and contacts the first pole of the battery. The light member of the light unit is activated.

Preferably, the clamp end has a first arm and a second arm extending therefrom. An opening is defined between the first and second arms. The first arm has an engaging groove defined in the inside thereof so as to receive the brake cable. A locking member extends through the first arm and contacts against the brake cable.

Preferably, the first arm has a room defined therein. The room communicates with the opening and a nut is located in the room. The locking member extends into the room and is threadedly connected to the nut.

Preferably, the light end has a recess and the battery is located in the recess. A cap is mounted to two sides of the light end and covers up the recess. The second leg is a curved leg and extends along the inner periphery of the recess and contacts the second pole of the battery in the recess. The cap has an annular groove. An urging member is located at the center of the annular groove. A water-proof ring is located in the annular groove so as to fill a gap between the cap and the battery. The urging member contacts the battery.

Preferably, the clamp portion has a notch defined in the distal end Thereof. The notch receives the brake cable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
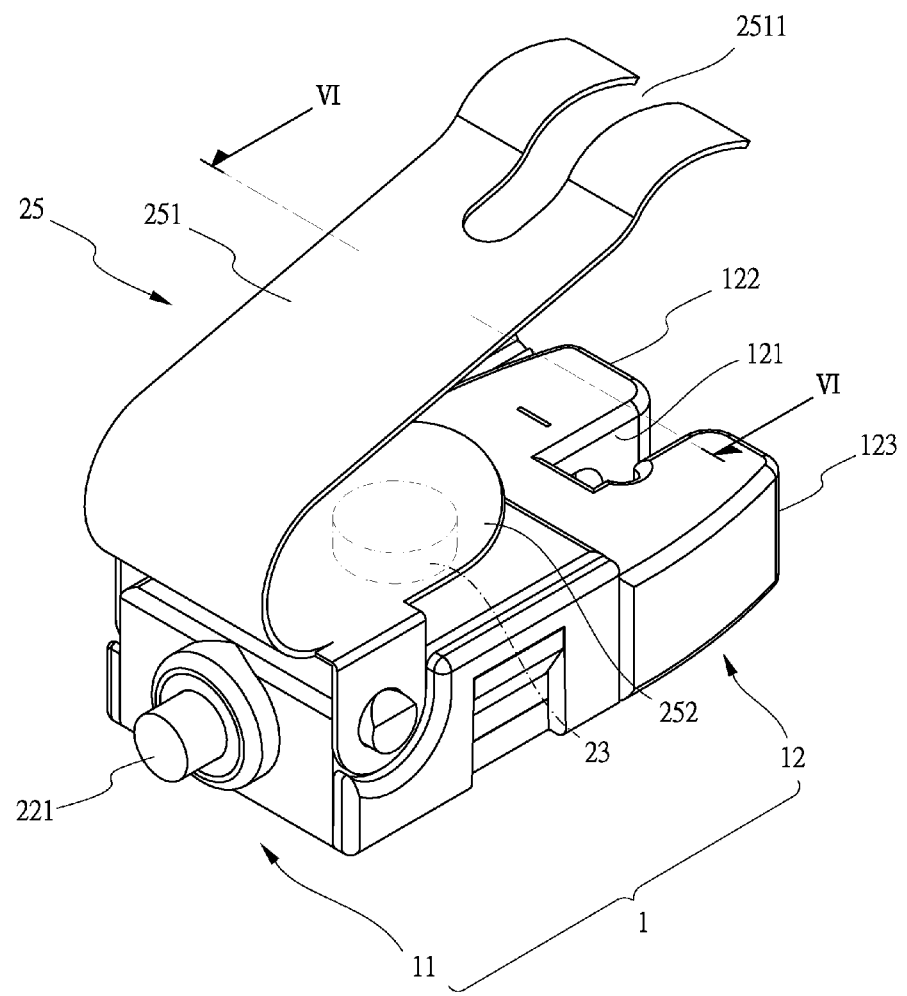
FIG. 1 is a perspective view to show the bicycle light assembly of the present invention.

Referring to FIGS. 1 to 5, the bicycle light assembly of the present invention comprises a body 1 having a light end 11 and a clamp end 12 on two ends thereof. A light unit 2 is located in the light end 11 and has a battery 21 which has a first pole 211 and a second pole 212. The first and second poles 211, 212 have opposite polarities. The first pole 211 is the positive pole and the second pole 212 is the negative pole. A light member 22 has a light bulb 221, a first leg 222 and a second leg 223. The first leg 221 has the first end connected to the light bulb 221, and the second end of the first leg 221 is located corresponding to the first pole 211 of the battery 21. The second leg 222 has the first end connected to the light bulb 221, and the second end of the second leg 222 is connected to the second pole 212 of the battery 21.

A button unit 23 has a button 231 and a touch end 232, wherein the button 231 protrudes from the surface of the light end 11 of the body 1. The touch end 232 is located in the light end 11 and corresponding to the first leg 222. An isolation ring 24 is a tapered ring and made by electricity isolation material. The isolation ring 24 has a central hole 241. The isolation ring 24 is tapered toward the button unit 23. The first leg 222 in contact with the surface of the isolation ring 24. The second end of the first leg 222 is located corresponding to the central hole 241 and the first pole 211. The first leg 222 is located between the button unit 23 and the isolation ring 24.

A resilient member 25 is pivotably connected to the body 1 and has a clamp portion 251 which is connected with a brake cable 102. A press portion 252 extends from the clamp portion 251 and is located corresponding to the button unit 23. The clamp portion 251 and the press portion 252 form a curved shape, so that the curved portion provides the resilient feature so that the resilient member 25 can be deformed and able to bounce back. The curved portion also provide a buffering feature so that the resilient member 25 does not break.

As shown in FIGS. 4 to 7, the brake device 10 of a bicycle comprises a brake arm 101, and the brake cable 102 connected to the brake arm 101. The brake cable 102 has an adjustment member 103 connected thereto and located on the left side of the brake arm 101. The bicycle light assembly of the present invention is connected to the brake cable 102, and located between the adjustment member 103 and the brake arm 101. When braking, the brake cable 102 is pulled upward and the body 1 is secured to the brake cable 102 by the clamp end 12, so that the body 1 is moved upward with the brake cable 102. The clamp portion 251 of the resilient member 25 is in contact with the adjustment member 103, so that when the body 1 is pivoted relative to the resilient member 25, the button unit 23 is in contact with the press portion 252. The touch end 232 pushes the first leg 222 of the light member 22, the first leg 222 extends through the central hole 241 and contacts the first pole 211 of the battery 21. This electrically connect the light member 22 with the battery 21, so that the light member 22 is activated. On the contrary, when releasing the braking device, the brake cable 102 is lowered and the body 1 together with the resilient member 25 are moved downward. The resilient member 25 is removed from the adjustment member 103 and bounces back, so that the body 1 is pivoted reversely relative to the resilient member 25 so that the button unit 23 is not pressed by the resilient member 25. The first leg 222 is disengaged from the battery 21 and moves to outside of the central hole 241. The circuit is opened. The periphery of the isolation ring 24 contacts the battery 21, the periphery of the central hole 241 is separated from the battery 21, so that the first leg 222 on the isolation ring 24 does not touch the battery 21. The circuit is connected again when the first leg 222 is pressed by the button unit 23, and the first leg 222 is in contact with the first pole 211 of the battery 21.

By the isolation ring 24, the first leg 222 and the battery 21 can be separated from each other. When the brake device 1 is activated again, the first leg 222 is in contact with the battery 21 to connect the circuit, this prevents the first leg 222 from touching or bouncing off from the battery 21 because of the curvature of the first leg 222.

Figure 2:
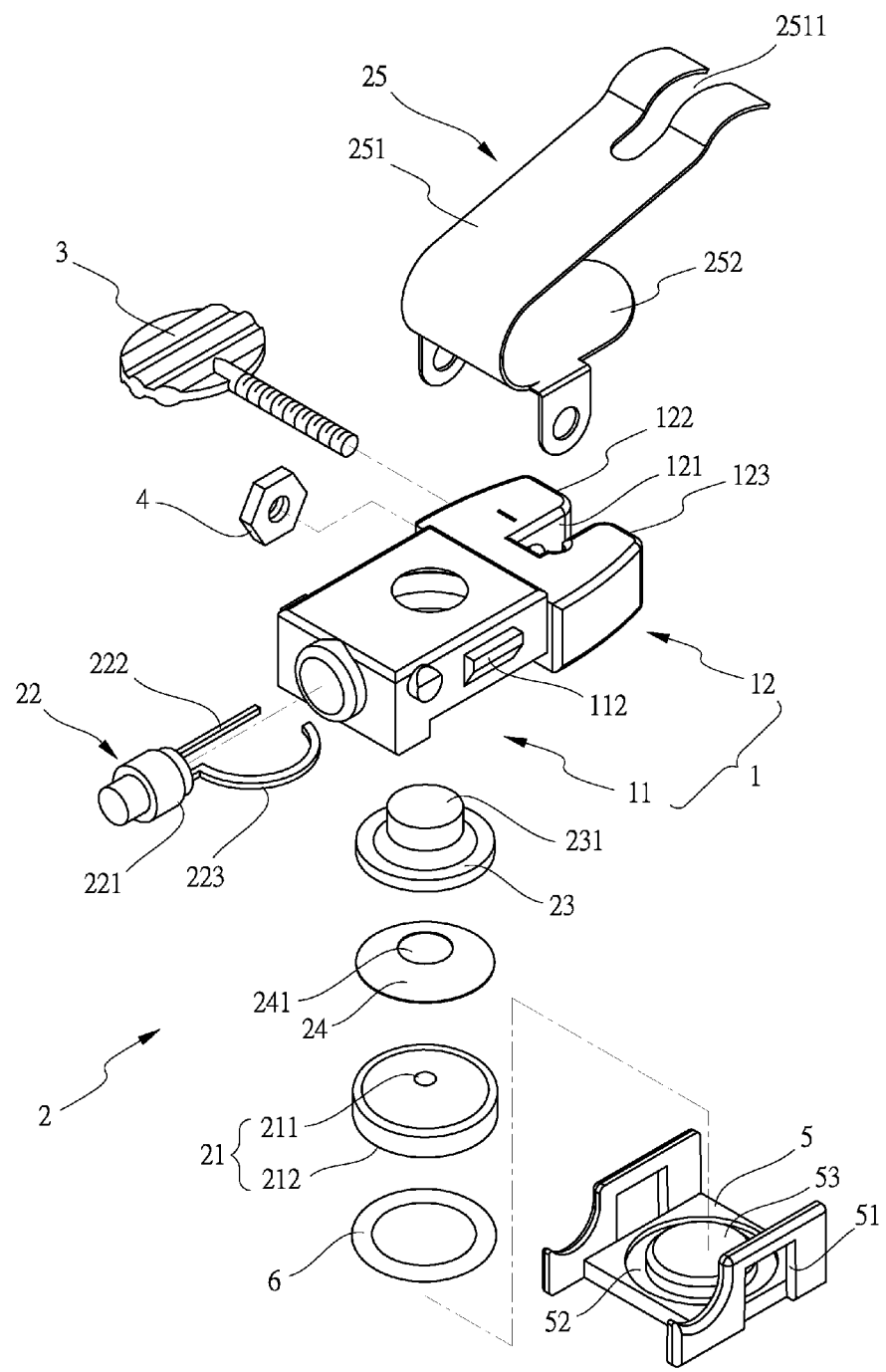
FIG. 2 is an exploded view of the bicycle light assembly of the present invention.
Figure 3:
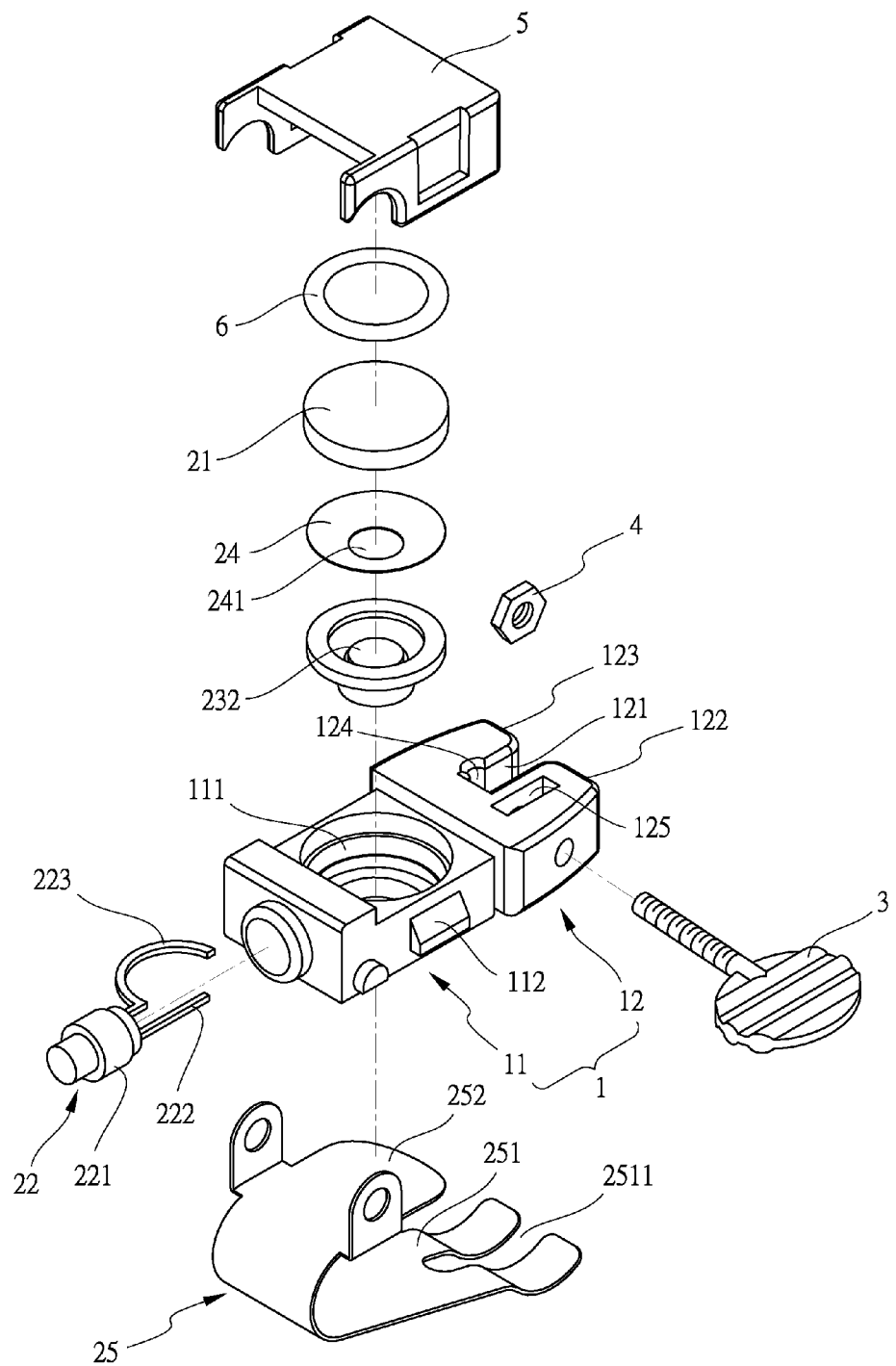
FIG. 3 is another exploded view of the bicycle light assembly of the present invention.
Figure 4:
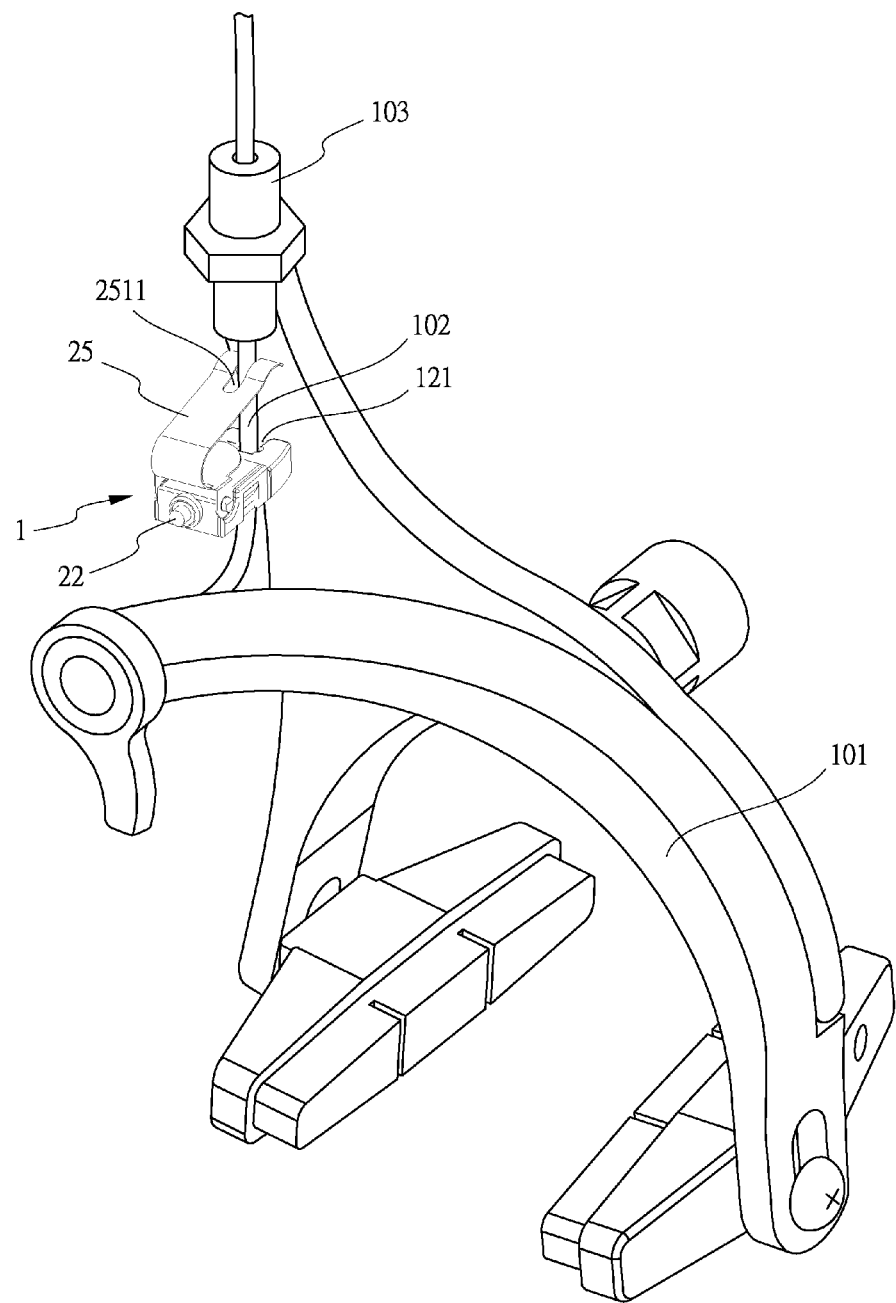
FIG. 4 shows that the bicycle light assembly of the present invention is installed to a bicycle.
Figure 5:
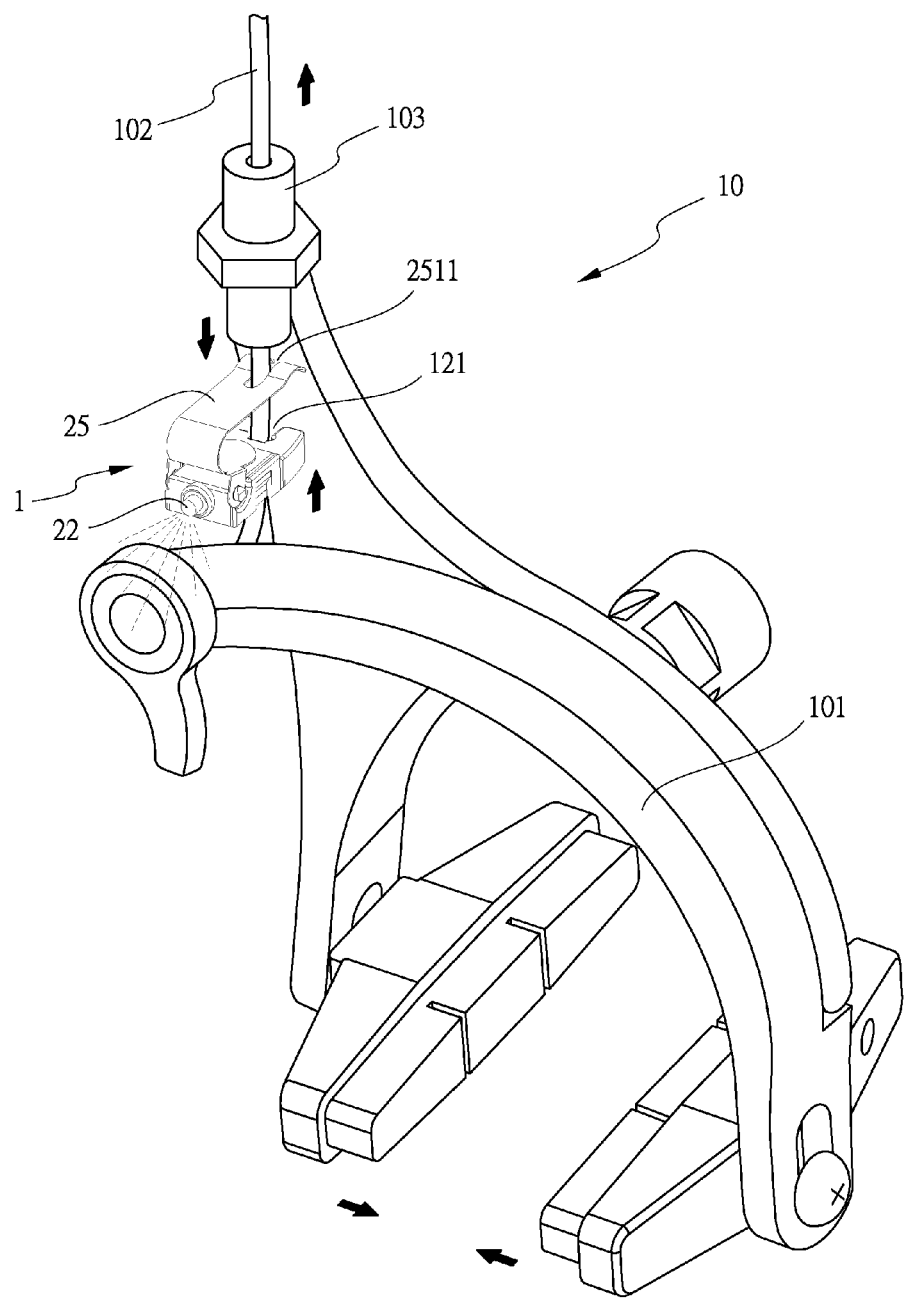
FIG. 5 shows that light unit the bicycle light assembly of the present invention is activated when braking.
Figure 6:
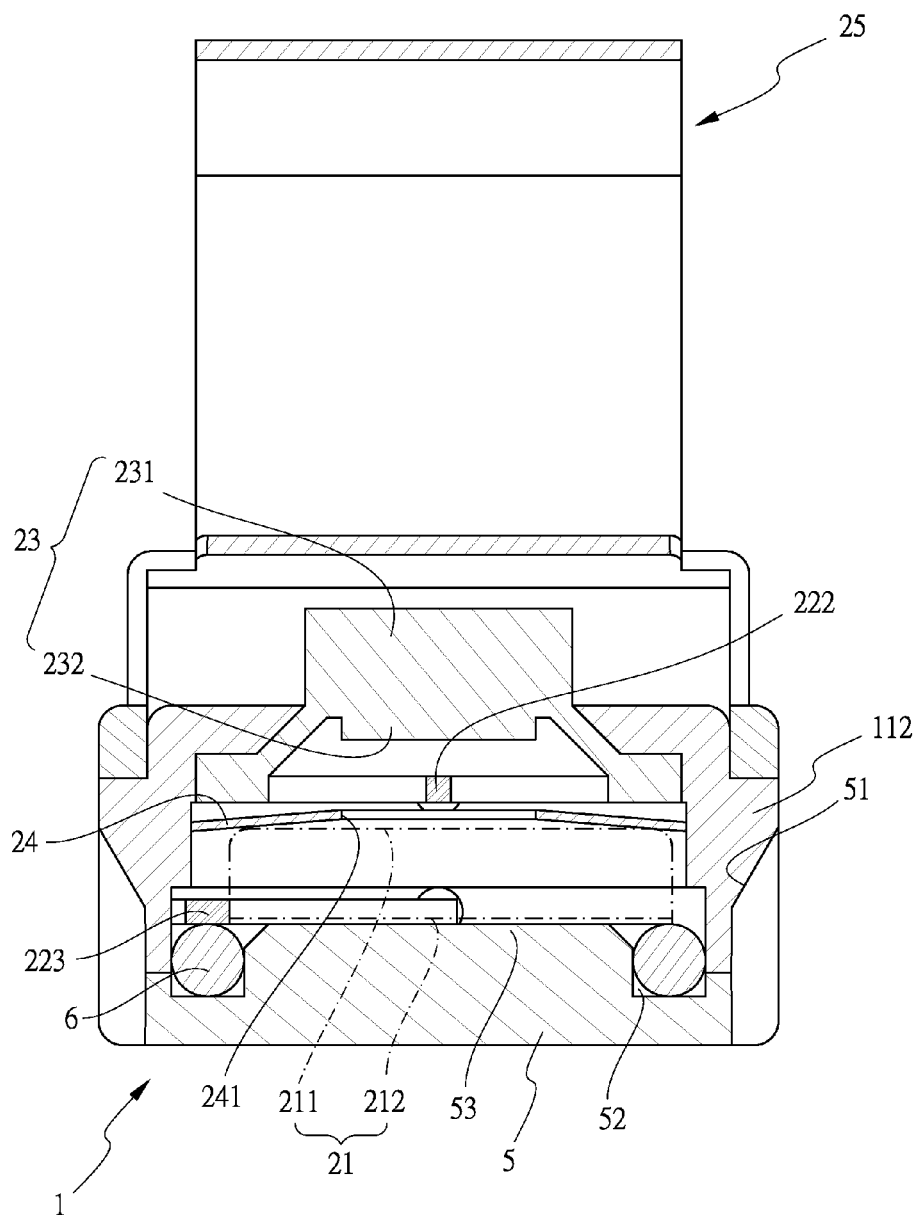
FIGS. 6 and 7 are cross sectional views along line A-A in FIG. 1 to show the actions of the bicycle light assembly of the present invention is activated.
Figure 7:
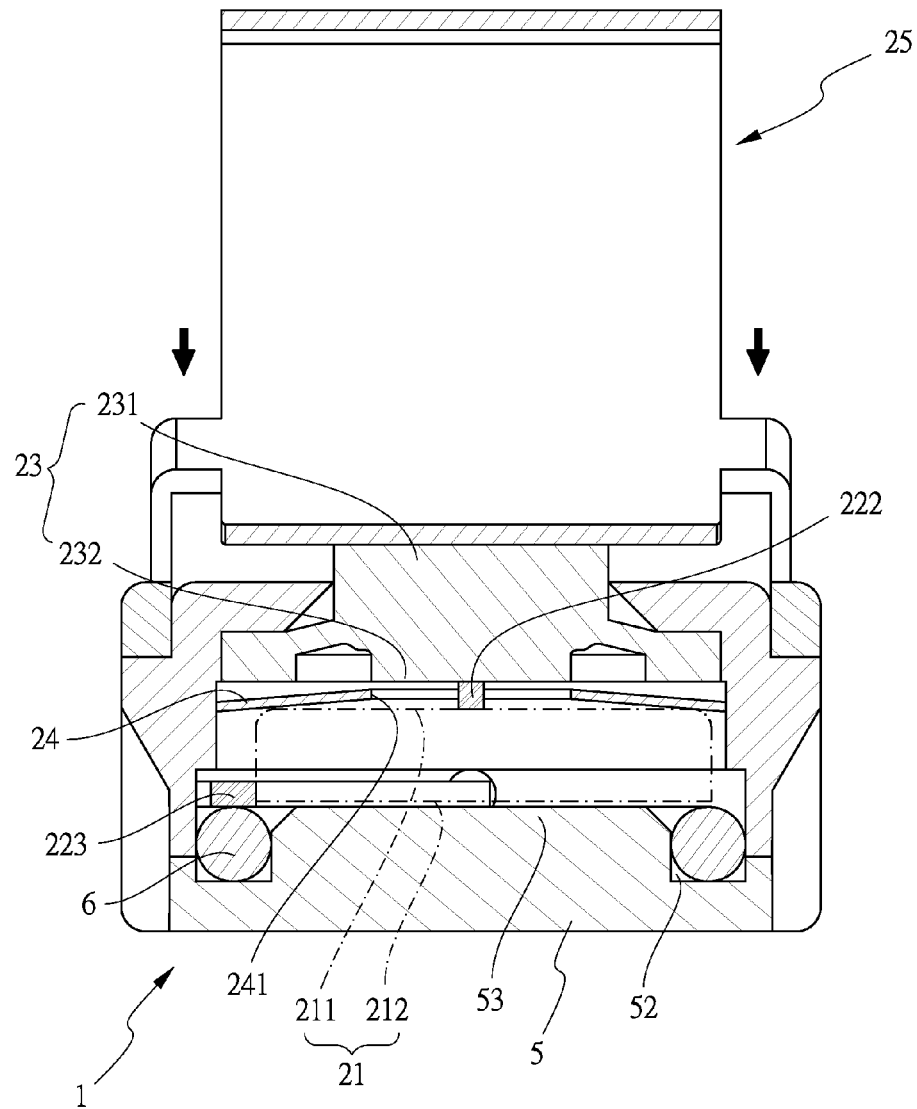
Figure 8:
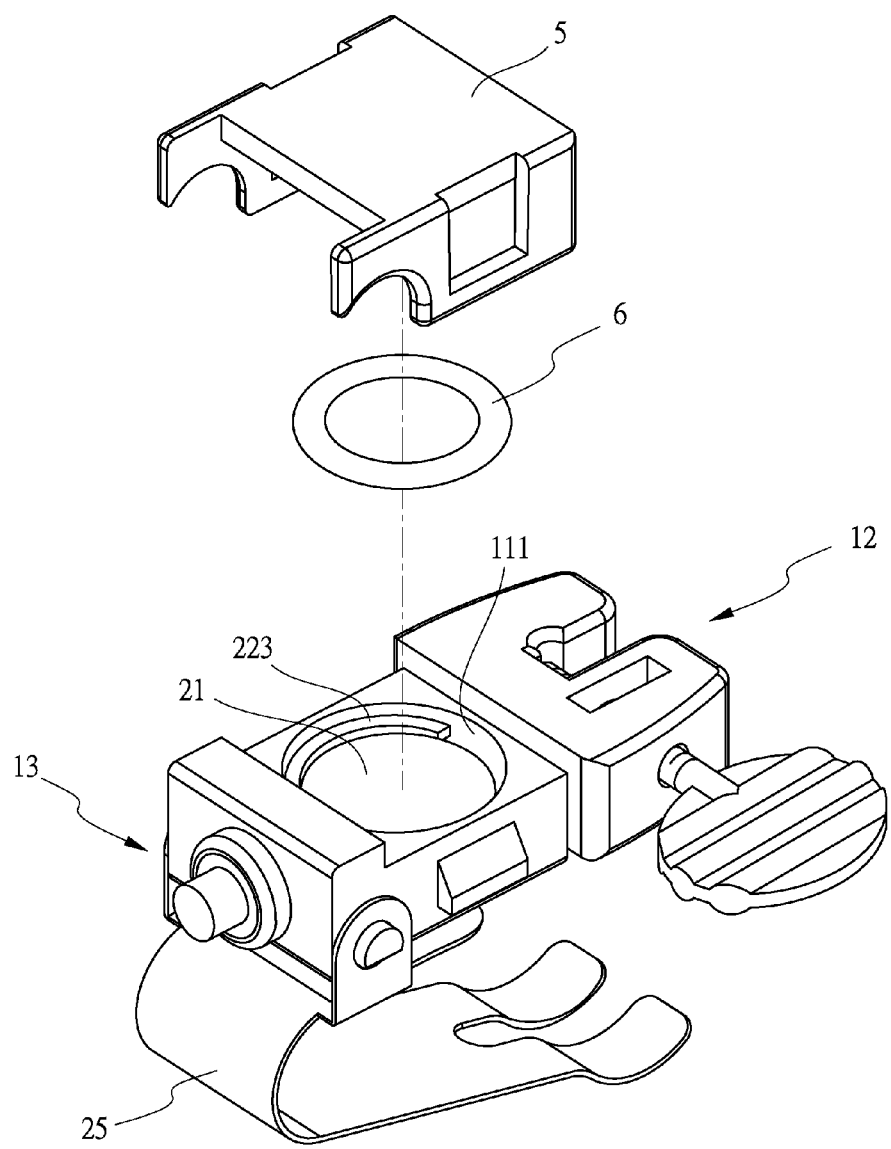
FIG. 8 shows the cap and the bicycle light assembly of the present invention.

As shown in FIGS. 2 and 3, the clamp end 12 has a first arm 122 and a second arm 123 extending therefrom. An opening 121 is defined between the first and second arms 122, 123. The brake cable 102 is located in the opening 121. The first arm 123 has an engaging groove 124 defined in the inside thereof, and the engaging groove 124 receives the brake cable 102. A locking member 3 extends through the first arm 122 and contacts against the brake cable 102 in the engaging groove 124. By the locking member 3, the brake cable 102 is secured to the body 1.

As shown in FIG. 3, the first arm 122 has a room 125 defined therein. The room 125 communicates with the opening 121 and a nut 4 is located in the room 125. The locking member 3 extends into the room 125 and is threadedly connected to the nut 4. By rotating the locking member 3 to allow the locking member 3 move relative to the nut 4 to adjust the positioning of the brake cable 102.

As shown in FIGS. 2, 3, 6 and 7, the light end 11 has a recess 111 and the battery 21 is located in the recess 111. A cap 5 is mounted to two sides of the light end 11 and covers up the recess 111. The light end 11 has a tapered protrusion 112 extending from each of the two sides thereof, and the cap 5 has a snap hole 51 in each of the two sides thereof, so that the tapered protrusions 112 are connected to the snap holes 51. The second leg 223 is a curved leg and extends along the inner periphery of the recess 111 and constantly contacts the second pole 212 of the battery 21 in the recess 111. The cap 5 has an annular groove 52 and an urging member 53 is located at the center of the annular groove 52. A water-proof ring 6 is located in the annular groove 52 so as to fill the gap between the cap 5 and the battery 21. The urging member 53 contacts and positions the battery 21. The clamp portion 251 has a notch 2511 defined in the distal end thereof, the notch 2511 receives the brake cable 102 which is secured and does not shift.

While we have shown and described the embodiment in accordance with the present invention, it should be clear to those skilled in the art that further embodiments may be made without departing from the scope of the present invention.

What is claimed is:
1. A bicycle light assembly comprising:
a body (1) having a light end (11) and a clamp end (12);
a light unit (2) located in the light end (11) and having a battery (21) which has a first pole (211) and a second pole (212);
a light member (22) having a light bulb (221), a first leg (222) and a second leg (223), the first leg (222) having a first end connected to the light bulb (221) and a second end of the first leg (222) located corresponding to the first pole (211) of the battery (21), the second leg (223) having a first end connected to the light bulb (221) and a second end of the second leg (223) connected to the second pole (212) of the battery (21);
a button unit (23) having a button (231) and a touch end (232), the button (231) protruding from a surface of the light end (11) of the body (1), the touch end (232) located in the light end (11) and corresponding to the first leg (222);
an isolation ring (24) being a tapered ring and having a central hole (241), the isolation ring (24) tapered toward the button unit (23), the first leg (222) being in contact with a surface of the isolation ring (24), the second end of the first leg (222) located corresponding to the central hole (241) and the first pole (211), the first leg (222) located between the button unit (23) and the isolation ring (24), and
a resilient member (25) pivotably connected to the body (1) and having a clamp portion (251) which is adapted to be connected with a brake cable (102), a press portion (252)

extending from the clamp portion (251) and located corresponding to the button unit (23).

2. The bicycle light assembly as claimed in claim 1, wherein the clamp end (12) has a first arm (122) and a second arm (123) extending therefrom, an opening (121) is defined between the first and second arms (122, 123), the first arm (122) has an engaging groove (124) defined in an inside thereof, the engaging groove (124) is adapted to receive the brake cable (102), a locking member (3) extends through the first arm (122) and is adapted to contact against the brake cable (102).

3. The bicycle light assembly as claimed in claim 2, wherein the first arm (122) has a room (125) defined therein, the room (125) communicates with the opening (121) and a nut (4) is located in the room (125), the locking member (3) extends into the room (125) and is threadedly connected to the nut (4).

4. The bicycle light assembly as claimed in claim 1, wherein the light end (11) has a recess (111) and the battery (21) is located in the recess (111), a cap (5) is mounted to two sides of the light end (11) and covers up the recess (111).

5. The bicycle light assembly as claimed in claim 4, wherein the second leg (223) is a curved leg and extends along an inner periphery of the recess (111) and contacts the second pole (212) of the battery (21) in the recess (111).

6. The bicycle light assembly as claimed in claim 4, wherein the cap (5) has an annular groove (52), an urging member (53) is located at a center of the annular groove (52), a water-proof ring (6) is located in the annular groove (52) so as to fill a gap between the cap (5) and the battery (21), the urging member (53) contacts the battery (21).

7. The bicycle light assembly as claimed in claim 1, wherein the clamp portion (251) has a notch (2511) defined in a distal end thereof, the notch (2511) is adapted to receive the brake cable (102).

\* \* \* \* \*